Feb. 2, 1937.     F. L. PRESCOTT     2,069,271
TORSIONAL VIBRATION RECORDING INSTRUMENT
Filed Sept. 5, 1931     4 Sheets-Sheet 1
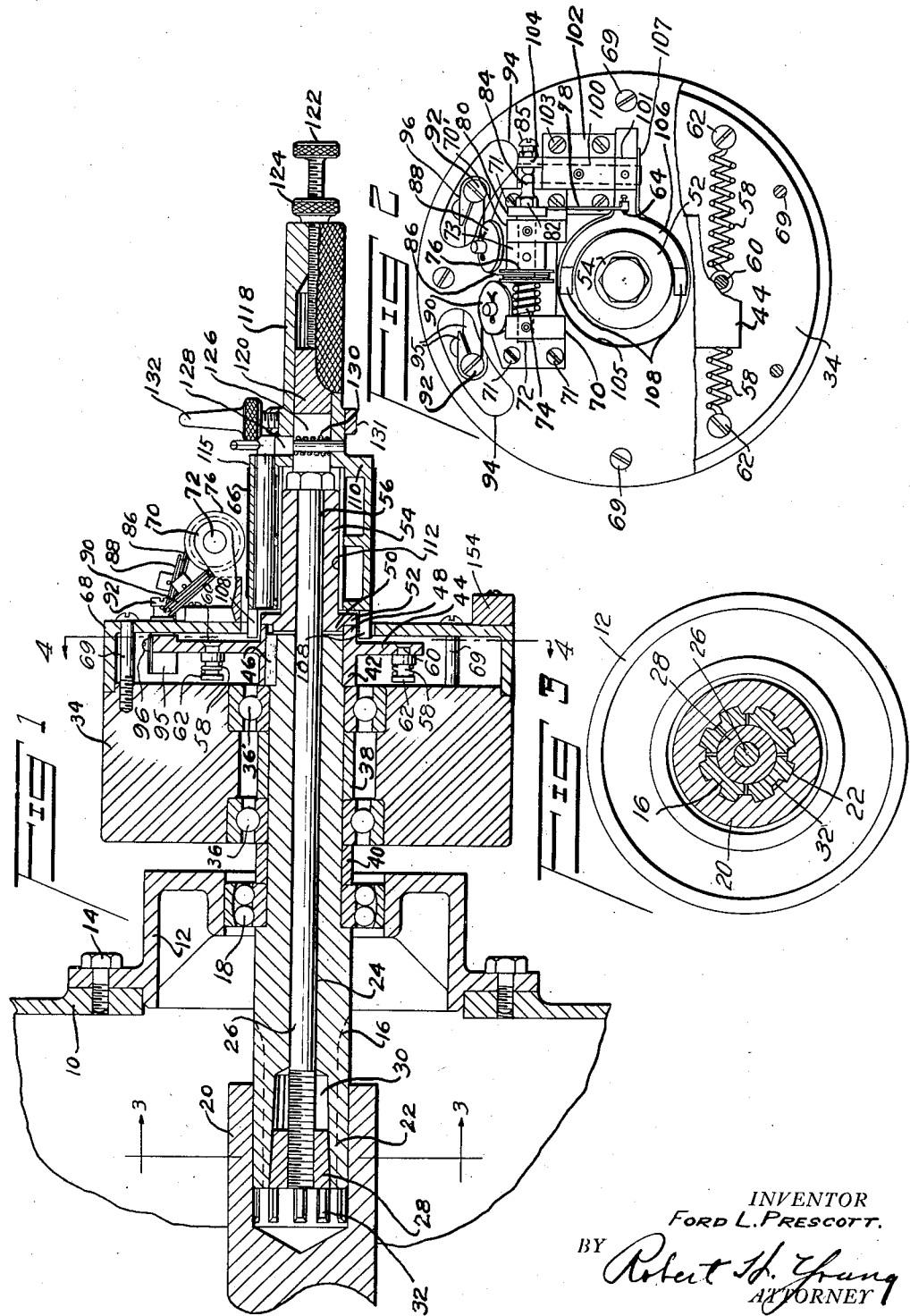
INVENTOR
FORD L. PRESCOTT.
BY Robert H. Young
ATTORNEY Feb. 2, 1937.  F. L. PRESCOTT  2,069,271
TORSIONAL VIBRATION RECORDING INSTRUMENT
Filed Sept. 5, 1931  4 Sheets-Sheet 2
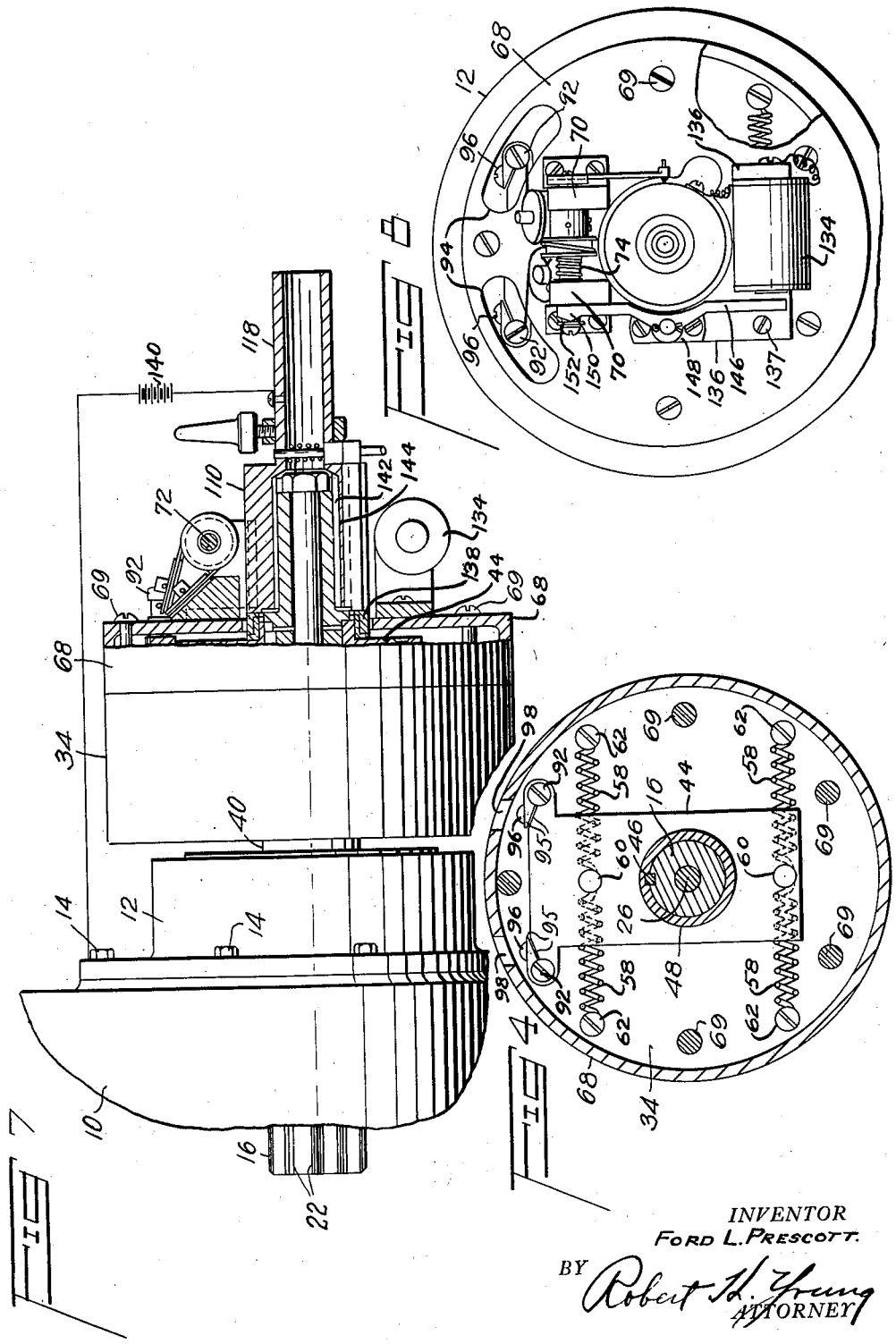
INVENTOR
FORD L. PRESCOTT.
BY Robert H. Young
ATTORNEY Feb. 2, 1937.  F. L. PRESCOTT  2,069,271
TORSIONAL VIBRATION RECORDING INSTRUMENT
Filed Sept. 5, 1931  4 Sheets-Sheet 3
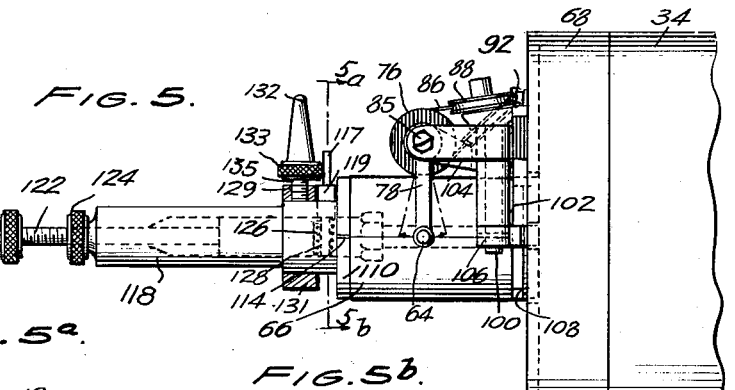
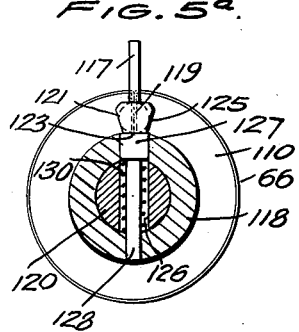
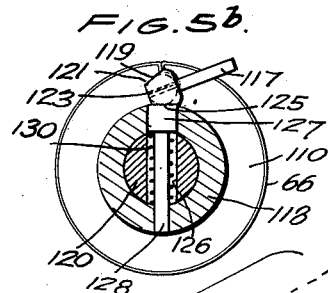
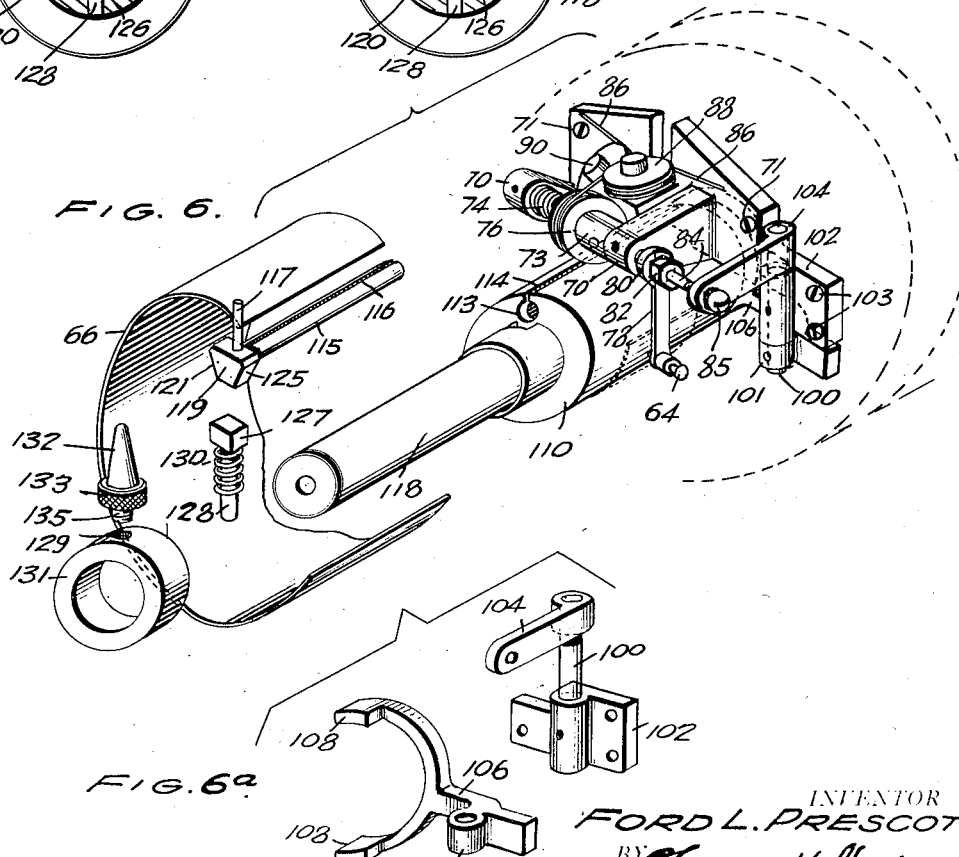
INVENTOR
FORD L. PRESCOTT
BY Francis H. Underwood
and Wade Koontz
ATTORNEYS Feb. 2, 1937.    F. L. PRESCOTT    2,069,271
TORSIONAL VIBRATION RECORDING INSTRUMENT
Filed Sept. 5, 1931    4 Sheets-Sheet 4
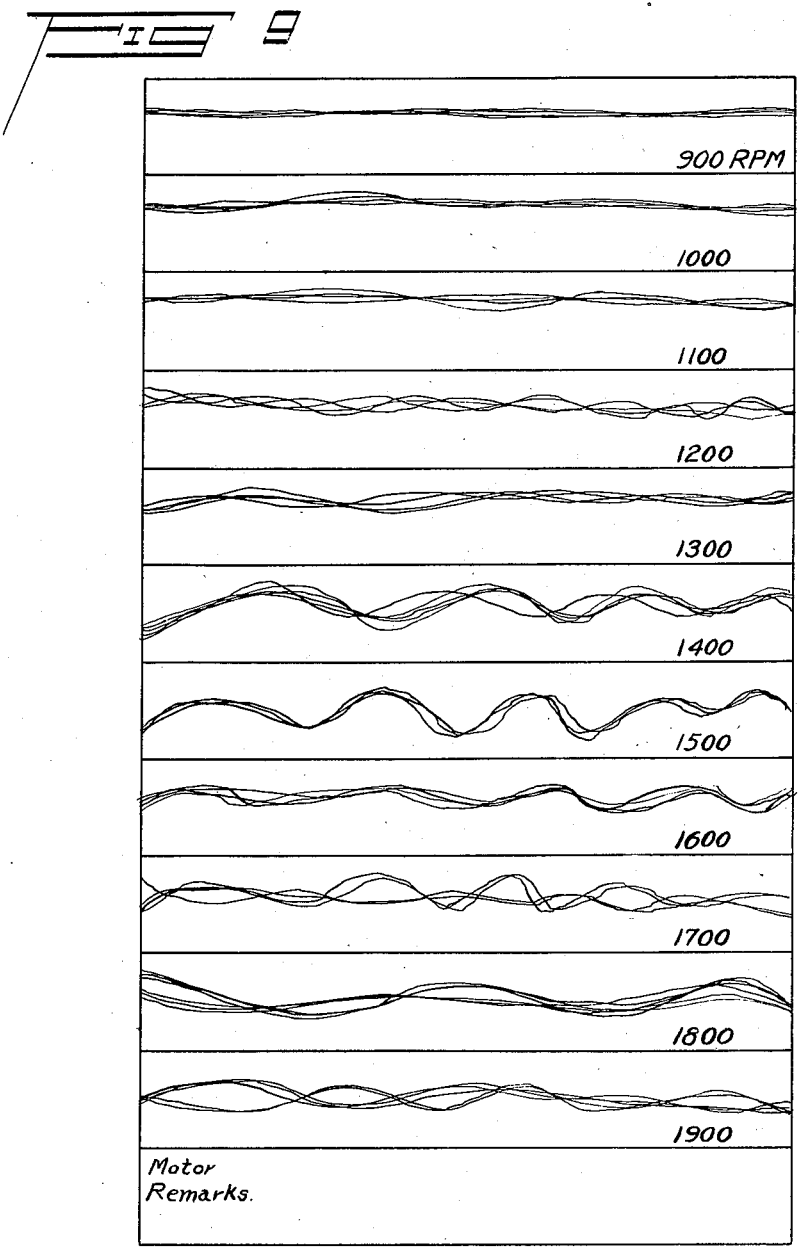
INVENTOR
FORD L PRESCOTT
BY
ATTORNEY Patented Feb. 2, 1937

2,069,271

UNITED STATES PATENT OFFICE 2,069,271

TORSIONAL VIBRATION RECORDING INSTRUMENT

Ford L. Prescott, Dayton, Ohio

Application September 5, 1931, Serial No. 561,488

21 Claims. (Cl. 234—5.6)

(Granted under the act of March 3, 1883, as amended April 30, 1928; 370 O. G. 757)

The invention described herein may be manufactured and used by or for the Government for governmental purposes, without the payment to me of any royalty thereon.

My invention relates in general to vibration recording instruments and more in particular to a torsional vibration recording device that is suitably adapted for non-uniform rotating shafts and especially for engine crank shafts. It is well known that the power delivered by the pistons of an internal combustion engine to the crank shaft consists of a number of explosive impulses and consequently does not furnish a steady torque. This non-uniform torque sets up torsional vibrations in the crank shaft which become critical at certain synchronous speeds and result in failure of the crank shaft. It was, therefore, necessary to ascertain accurately the frequency and amplitude of such critical torsional vibrations in order that the crank shaft could be designed to withstand operation of the engine at the required speeds without failure. In accordance with my invention I have provided means for indicating and recording the relative movement of two members, one of which is adapted to rotate at non-uniform angular velocity corresponding to the rotation of the crank shaft under investigation and the other at a substantially uniform rate whose average value is the same as that of the crank shaft. Preferably my invention contemplates an indicating and recording instrument that is adapted for rigid attachment, as a unit, to a crank shaft of an internal combustion engine and including a shaft or arbor rigidly connected with one end of the crank shaft to form an extension thereof and to be rotated thereby at the same non-uniform angular velocity of the crank shaft and a fly wheel mounted on the extension shaft and yieldingly rotatable therewith by means of an elastic connection that will allow the fly wheel to rotate at a constant speed irrespective of the vibrations of the crank shaft to which the extension shaft is connected. An indicator arm is provided for continuous rotation with the fly wheel and is adapted to be vibrated in the substantially axial direction of the extension shaft by and in response to the relative angular displacement of the fly wheel and the extension shaft. The indicator arm is provided at its free end with a stylus or other marking device for recording on a record-receiving member the movements of the arm which is mounted in such a manner that when in non-recording position it holds the stylus in spaced relation with the recording surface but when it is desired to obtain a record a small axial motion of the drum into record-receiving position will result automatically in the movement of the arm toward the drum and the placing of the stylus in contact with the recording surface thereof. This actuation of the stylus may be accomplished either mechanically or electro-magnetically as is hereinafter shown and described.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:

Fig. 1 is a longitudinal sectional view of the recording device embodying my invention connected for operation with the crank shaft of an internal combustion engine:

Fig. 2 is an end view of the recording device with the record-receiving member omitted and with a fragment broken away to expose the elastic drive:

Fig. 3 is a cross sectional view taken on the line 3—3 of Fig. 1:

Fig. 4 is a cross sectional view taken on the line 4—4 of Fig. 1:

Fig. 5 is a side view of the device, the reverse of that shown in Fig. 1 and with the parts in elevation:

Fig. 5a is a cross sectional view on an enlarged scale of the record-sheet holder, or drum, taken on the line 5a—5b of Fig. 5 and disclosing a record-sheet locking or clamping mechanism, the latter being in non-clamping position:

Fig. 5b is a view similar to Fig. 5a but showing the record-sheet clamping mechanism in sheet-clamping position:

Fig. 6 is a view in perspective of the recording-mechanism with the record-sheet and the sheet-clamping members and the index device in a disassembled state:

Fig. 6a is a view, in perspective and on an enlarged scale, of certain parts of a stylus-shifting mechanism:

Fig. 7 is a modification of my invention:

Fig. 8 is an end view looking from right to left of Fig. 7, the record-receiving drum of the recording mechanism being removed, and Fig. 9 shows a number of records of the torsional vibrations of an internal combustion engine crank shaft at successive stages of 100 R. P. M. ranging from 900 R. P. M. to 1900 R. P. M.

My device is preferably adapted to be connected to the end of an engine crank shaft opposite that on which a fly wheel or propeller may be attached and as shown in Fig. 1, the numeral 10 designates a fixed portion of an engine as, for example, the crank case to which a journal support, 12, is rigidly connected by suitable means, such as bolts 14. An extension shaft 16 is rotatably mounted in a bearing 18 in support 12 and is rigidly connected to an engine crank shaft 20 by means of expansible splines 22. The extension shaft 16 is provided with an axial bore 24 its entire length to receive a headed screwbolt 26, the threaded end of which is provided with a tapered nut 28 that is adapted to be drawn within a tapered socket 30 at the spline-bearing end and of the extension shaft to thereby expand the splines 22 into engagement with complementary splines 32 of the crank shaft. An inertia member, or fly wheel 34, is mounted to rotate on a pair of annular ball-bearings 36—36' fitted to the extension shaft 16 and spaced from each other on the shaft by a spacer ring 38. The inertia member is maintained in spaced relation to the bearing 18 by a spacer ring 40 disposed between bearing 18 and the inner fly wheel bearing 36. The outer fly wheel bearing 36' is in abutment with an inwardly disposed hub-portion 42 of a driving member 44. The driving member, as shown in Figs. 1 and 4, is a relatively light body mounted on the extension shaft 16 in proximity to the outer face of the heavy body or inertia member 34 and is fixedly secured by means of a key 46 for rotation with the extension shaft and is yieldingly connected to the inertia member in a manner hereinafter described. The inwardly disposed hub portion 42 of the driving member serves to space the driving member from the inertia member and the driving member is also formed with an outwardly extending hub-portion 48 that projects beyond the outer end of the extension shaft to receive a centering projection 50 and abut against a flange 52 of a pilot bearing 54. The pilot bearing is provided with an axial bore 56 to receive the bolt 26; the head of the bolt being drawn tight against the outer end of the pilot bearing 54 when the bolt is rotated to draw the nut 28 into the socket 30, thereby causing the flange 52 of the pilot bearing to press against the hub-portion 48 of the driving member. The bolt and tapered nut together with the pilot bearing thus serve to clamp in assembled relation the several parts mounted on the extension shaft.

A substantially uniform rotation is imparted to the fly wheel by means of a yieldable connection or drive between the driving member and the fly wheel and to this end the yieldable connection disposed between the fly wheel and the driving member is shown preferably as consisting of two pairs of opposing springs 58: the springs of each pair having their adjacent inner ends connected to pins 60 that are fixed to the driving member and having their outer ends held in tension and in substantial alignment by means of pins 62 fixed to the fly wheel. It will thus be obvious that with this yieldable connection between the driving member and the inertia or driven member, the latter will be rotatively driven by the driving member but any torsional vibrations resulting from the non-uniform angular velocity of the crank shaft and imparted to the driving member from the crank shaft will be absorbed in the elastic driving connection and, hence, will not appreciably affect or disturb the uniform rotation of the fly wheel.

The driving member 44 is enclosed between the heavy body 34 and a cover 68 on the outer face of the body; the cover being secured to the body for rotation as an integral part therewith by screws 69. Cover 68 is provided on its outer face with a bearing bracket having a pair of spaced apart bearing lugs 70—70' the bracket being fastened to the cover by screws 71. A shaft 72 is journaled in the lugs 70—70' and has a sliding movement in the direction of its axis. The axial movement of the shaft 72 is limited in one direction by a block 73 fixed to the shaft for abutment with the inner face of the lug 70' and in the opposite direction by a head 80 formed on the shaft for abutment with the outer face of the said lug. The block 73 is provided with a cable drum 76 and a spring 74 encircles the shaft 72 with one end resting against the inner face of bearing lug 70 and the other end resting against the adjacent face of the drum 76. Spring 74 is so tensioned as to yieldingly hold the shaft 72 at the limit of its axial movement to the right in Fig. 2 so that the shaft head 80 is normally spaced from the outer face of bearing lug 70'. The shaft 72 is provided with a radially disposed indicator arm or lever 78, one end of which is received in a slot extending diametrically of the outer face of the shaft head 80 to which the said end of the lever is connected by a holding screw, the head 82 of which is provided, for a purpose hereinafter explained, with a teat-like projection 84. The shaft 72 is disposed cross-wise of the face of the cover 68 so that its axis is at right angles to the axis of the extension shaft. Hence, when the shaft 72 is turned about its axis, the free end of the lever 78 moves in a direction substantially parallel to the axial direction of the extension shaft. The shaft 72 is turned about its axis, in response to relative movements between the driven member 34 and the driving member 44, by a cable 86 passing one or more times around the cable drum 76 with its ends attached to pins 92 carried by the driving member 44 and projecting through arcuate slots 94 in the cover 68. Slots 94 are of such dimension that the pins 92 move freely back and forth therein during relative movements of the driving and driven members. The cable 86 is guided in its movements to and from the cable drum by suitably disposed bracket-supported guide pulleys 88 and 90 and it may be adjusted as to tautness by rotation of the pins 92 to wind the ends of the cable therearound or to unwind the same therefrom. These pins 92 have holes in their outer or projecting ends for the insertion of the cable ends and they are normally held against rotation by being clamped between split portions 95 of the driving member connected together by adjusting screws 96. Access to screws 96, for adjusting the clamps, is permitted through holes 98 formed in cover 68.

In the operation of the device, the driving member 44 being relatively light and rigidly coupled thru shaft 16 with the crank shaft 20, acquires from the crank shaft the same movements of torsional vibration and angular velocity whereas the driven member 34, being unaffected by the torsional vibrations of the crank shaft since these vibrations are absorbed in the elastic drive, rotates at a substantially constant angular velocity equal to the average angular velocity of the crank shaft. Torsional vibrations in the crank shaft will, therefore, result in small relative movements between the driving member 44 and the driven member 34 with a consequent turning of the indicator-shaft 72 about its axis and a resultant displacement of the free end of the indicator 78 substantially in the axial direction of the extension shaft. The displacement of the free end of the indicator 78 will be either to the left or right of a central or neutral position, as indicated by the arrows in Fig. 5, according to whether the direction of movement of the driving member relative to the driven member is clockwise or anti-clockwise. By reason of the free end of the lever being radially remote from the axis of shaft 72, an amplified indication of the relative movements of the driving and driven members is obtained due to the fact that the movement of the free end of the arm is considerably greater than the said relative movement.

The free end of the lever or indicator arm 78 carries a stylus or marking device 64 adapted, when pressed against the surface of a record-receiving member, such as a sensitized sheet 66, to mark the same for recording the movements of the lever. Sheet 66 is supported on the cylindrical surface of a holder or drum 110 which is provided with a central bore 112 leading inwardly of one end thereof and a hollow handle 118 extending axially from its opposite end. The drum is adapted to be placed endwise upon the pilot bearing 54 and slid inwardly thereon to a predetermined position by means of its handle 118; the drum being held manually against rotation with the pilot bearing turning within the bore 112. The pilot bearing thus serves as a guide for centering the drum properly with respect to the axis of rotation of the cover 68.

The movement of the drum inwardly on the pilot bearing is limited or arrested by means of an adjustable stop consisting of a slidable block 120 mounted within the hollow handle 118 and projecting partially into the axial bore 112 of the drum to abut the head of the bolt 26 when the drum has been moved a predetermined distance inwardly on the pilot bearing 54. The extent to which the drum may be moved inwardly on the pilot bearing before the projecting end of the slide block contacts with the head of bolt 26, depends upon the amount of the projection and this, in turn, is regulated and controlled by the adjustment of a screw 122 extending inwardly of the outer end of the handle 118 and contacting the adjacent outer end of the block to limit the movement of the latter toward the outer end of the handle. As will be obvious, this construction permits a wide range of adjustment of the block 120 between the limits of maximum and minimum projection and consequently greater latitude in positioning the drum on the pilot bearing. A lock nut 124 is associated with the screw 122, in the manner shown, for locking it in position. The slide block 120 is bifurcated, as shown at 126, to avoid interference with a plunger 128 and its encircling spring 130, the latter elements being part of the following described mechanism for clamping sheet 66 in a fixed position on drum 110 and, for convenience and simplicity of construction, being disposed within the slot formed in the slide block 120 by the bifurcation 126 thereof.

As shown in Fig. 6, the drum 110 has a longitudinally extending cylindrical bore 113 located adjacent to, but below the surface of the drum and opening outwardly of the opposite ends of the drum. The portion of the drum intermediate the bore 113 and the adjacent surface is cut away to provide an open slot 114 coextensive with the bore 113. A cylindrical rod 115, having a paper-receiving slot 116, is journaled in said bore 113 to be turned about an axis for moving the said slot 116 to and from a position in which it is aligned with the slot 114 of the drum; the rod being manually turned by means of a handle 117 carried by a head 119 on the outer end of the rod. Head 119 is formed with angularly disposed flat faces 121, 123, and 125, and the drum handle 118 has the plunger 128 mounted therein to engage each of the said flat faces as they are brought into alignment therewith by the turning of the rod 115; the head 127 of the plunger being pressed against the contacted flat face of the head 119 of the rod by the upward thrust of spring 130. When the flat face 123 is in abutment with the head of the plunger, the handle 117 is upright and the slot 116 is in alignment with slot 114. The record-receiving sheet is passed about the drum with its free ends inserted through the slot 114 in the drum and secured in the slot 116 of the rotatable rod 115. The handle 117 is then moved from the upright position shown in Fig. 5a to the inclined position shown in Fig. 5b, imparting to the rod 115 a turning movement that shifts the slot 116 in a direction clockwise of the slot 114 and thereby drawing the ends of the sheet into the drum and tightening the sheet about the supporting surface of the drum. In this position of the rod, the side face 125 is in contact with the head of the plunger 128, the pressure of which holds the rod in sheet tightening position. The handle 117 may, if desired, be swung to the left in Fig. 5b rather than to the right, in which case the turning movement of the rod is arrested when the flat face 121 is in abutment with the plunger 128.

As previously explained, the free end of the arm 78, and hence the stylus 64, is normally spaced outwardly from the side of the pilot bearing 54 due to the thrust of spring 74. Suitable lever-shifting means are provided, however, for causing the stylus to contact with the record sheet 66 when the drum is properly positioned upon the pilot bearing and to be returned to normal position upon removal of the drum. In addition to the spring 74, the lever shifting means includes a shaft 100 rotatably supported in a bearing bracket 102 fixed by screws 103 to the cover 68 in the manner shown in Figs. 2 and 6. Shaft 100 projects above and below the supporting bracket 102 and on the projecting upper end is fixedly mounted a lever 104 extending outwardly at right angles to the face of cover 68 with its free end disposed adjacent the headed end of the indicator shaft 72. Fixed on the lower projecting end of shaft 100, and disposed substantially at right angles to the lever 104 is a yoke lever 106, the arms of the yoke being respectively provided at their free extremities with laterally extending projections 108. The yoke is concentric with the flange 52 of the pilot bearing 54 and extends partially around the same with the projections 108 disposed for contact with the end of drum 110, as clearly shown in Fig. 1. It will be observed that the yoke lever 106 is offset with respect to its pivot bearing 101 so as to be disposed inwardly of the shaft 100 and substantially in the plane of the cover 68, the latter having a larger central opening 105 and a radial slot 107 in which the offset yoke lever is received. The free end of lever 104 carries an adjustable striker pin 85 disposed therethrough for contact with the teat-like projection 84 of the indicator-arm retaining screw 82. In the normal position of the parts due to the thrust of spring 74, yoke arms of lever 106 extend outwardly of the cover-opening 105 so that the projections 108 are contacted by the inner end of drum 110 before the movement of the latter inwardly on the pilot bearing is arrested by the abutment of the block 120 with the head of bolt 26; that is, before the drum is in its correct record-receiving position. Hence, as the drum 110 travels the remaining distance to its correct position, it forces the yoke arms inwardly and the latter, being fixed to the shaft 100, turns the said shaft about its axis and causes the lever 104 to push the shaft 72 to the left in Fig. 2 and against the resistance of spring 74. The shaft 72, in its movement to the left, carries with it the arm 78 and the stylus 64; the latter being thereby moved into contact with the record-receiving sheet 66. When the head 80 of shaft 72 is in abutment with shaft bearing 70', the stylus 64 is in its position of maximum pressure against the record-receiving sheet 66. Less than maximum pressure may be obtained, however, either by readjustment of the block 120 into a position of earlier contact with the head of the bolt 26 with a consequent decreased movement of the yoke 106 or by re-adjusting the striker pin 85 to a position of later contact with the projection 84. The advantage of having two means of adjustments is that, by means of both adjustments, the same pressure of the stylus may be obtained for different positions of the drum on the pilot bearing.

In the use and operation of the invention, the improved indicating and recording device, with the exception of the drum 110 and the parts carried thereby, is attached as a unit to the engine crank shaft as shown in Fig. 1 and the engine shaft then rotated to obtain a predetermined identifying position of the engine. The drum 110 is then guided over the pilot bearing 54 with the slot 114 of the drum positioned in alignment with the point of stylus 64 to obtain a corresponding relationship of the operating cycle of the engine and the record thereof as subsequently made on the record sheet. The drum always occupies the same angular position on the pilot bearing and for identifying this position, a manually settable index is provided which consists of ring 131 rotatably mounted on the drum-handle 118 and a pointer 132 having a screw-threaded shank 135 engaged in a screw-threaded opening 129 in the ring; the pointer having a knurled head 133 whereby it may be screwed down tight against the handle 118 to lock the ring against rotation or unscrewed to permit turning of the ring about the handle to change the angular position of the pointer. In setting the index, the ring is turned while the drum is in place and stationary on the pilot bearing, to locate the pointer in a selected position, such as the vertical, which it is intended to occupy when the drum is in its correct angular position on the pilot bearing. The pointer is then screwed down tight. The drum is then withdrawn from the pilot bearing and the engine set in operation. The sheet 66 is now attached to the drum 110 subsequent to which the drum is held in the predetermined position indicated by the pointer, replaced on the pilot bearing, and then pressed inwardly against the projections 108 of the yoke lever to actuate the stylus-shifting mechanism. In this way, the record is started as soon as the drum is in record-receiving position and it will be obvious that if the drum, subsequent to its withdrawal from the pilot bearing at any stage in the operation of the engine, be replaced over the pilot bearing with the pointer in vertical position, it will assume its proper or original relationship with respect to the cycle of the engine.

In the absence of any torsional vibration in the crank shaft, the point of the stylus would travel around the drum without deviation from its circular path and would trace a straight line on the record sheet 66. However, in the actual operation of the engine, the stylus has a vibrational movement due to torsional vibrations set up in the crank shaft and resulting in the relative movement of the driving and driven member with which the stylus is operatively connected. Under such conditions, the point of the stylus in its travel around the drum will trace on the record-receiving sheet a wavy line or curve, the undulations of which constitute a record of the torsional vibrations of the engine crank shaft. The record of one engine cycle, or two revolutions of the crank shaft, comprises two curves, superposed. It will thus be seen that, since the stylus is rotatable with the uniformly rotating fly wheel, its circular motion provides a time axis (the speed of the shaft 20 being known) and that its displacement, as effected by the relative movement of the inertia member and the driving member, will produce a record of displacement against time.

Figs. 7 and 8 show a modification of my invention in which the stylus is moved into contact with the record-receiving member by electromagnetic means comprising an electro-magnet 134 mounted in a bracket 136 attached to the cover 68 by screws 137. One terminal of the electro-magnet is electrically connected to a slip ring 138 mounted on, but insulated from, the driving member 44, the other end of the magnet being grounded to the bracket 136. The electrical circuit is completed by grounding a battery 140 to the engine, the other terminal of the battery being connected to the drum 110 which is provided with an insulating bushing 142 within the bore 144 to prevent completion of the electrical circuit until the drum end contacts with the slip ring and is in full operative position.

The stylus actuating mechanism shown in this modification is identical to that shown and described above except that the stylus is actuated into operative position by an armature 146 pivoted on a bracket 148 that is mounted on cover 68. The armature is formed with a yoke 150 that straddles the end of stylus shaft and is disposed between the bearing 70 and a thrust collar 152. It will be apparent that when the electrical circuit is completed the armature will be drawn to the magnet thus actuating the stylus shaft yieldingly against the spring 74 and the stylus into operative position.

The adjusting screw 122 and nut, together with the sliding block, are not necessary with the electro-magnetic means of actuating the stylus into operative position.

I claim:

1. A device for recording torsional vibrations in a shaft which comprises a rotatable inertia mass mounted coaxially with the shaft, a resilient driving connection between the said shaft and the said inertia mass and yieldable to permit relative movement between the shaft and the inertia mass in response to torsional vibration of the shaft, and means for obtaining a record of the relative movement between the said shaft and the said inertia mass including a marking device rotatable with the inertia mass and movable in a direction substantially parallel to the axis of the shaft, said device being operatively connected with the said shaft to be moved in the said direction in response to the relative movement of the shaft and the inertia mass, and a non-rotating member having a cylindrical record receiving surface for contact with the said marking device.

2. Means adapted to cooperate with a non-rotating member having a cylindrical record-receiving surface to be marked for obtaining records of torsional vibrations in a rotating shaft which comprises a rotatable inertia mass mounted coaxially with the said shaft, a resilient driving connection between the shaft and the inertia mass and yieldable to permit relative movement between the shaft and the inertia mass in response to torsional vibration of the shaft, a marking mechanism fixed to and rotatable with the said inertia mass and including a stylus movable relative to the inertia mass in a plane at right angles to the plane of rotation of the inertia mass and marker mechanism, and means connecting said stylus with the said shaft and operating to move the stylus in response to relative movement between the shaft and the inertia mass.

3. A device for recording torsional vibrations in a shaft comprising a rotatable inertia mass mounted coaxially with said driving member, a resilient driving connection between the shaft and the inertia mass and yieldable to permit relative movement between the said shaft and the said inertia mass in response to torsional vibration of the shaft, a marking device rotatable with said inertia mass and movable relatively thereto in a direction substantially parallel to the axis of the shaft, an actuating connection between the marking device and the shaft responsive to the relative movement between the shaft and the inertia mass for moving the marking device in the said direction proportionally to the relative movement of the shaft and the inertia mass, and a non-rotating member having a cylindrical record-receiving surface for contact with the marking device.

4. A device for recording torsional vibrations in a shaft comprising a rotatable inertia mass mounted coaxially with the shaft, a resilient driving connection between the shaft and the inertia mass and yieldable to permit relative rotation of the shaft and the inertia mass in response to torsional vibrations of the shaft, a non-rotating record-receiving cylinder movable to and from record-receiving position coaxial with respect to the said inertia mass, a marking mechanism mounted on the inertia mass for rotation therewith in a circular path about the said cylinder and including a stylus movable radially of the axis of its circular path for placement into and out of recording-contact with the cylinder and being displaceable in a direction at right angles to the plane of the circular path for indicating torsional vibration of the shaft, said stylus being operatively connected with the said shaft to be so displaced by and in response to relative rotation of the shaft and the inertia member, and means responsive to the movement of the said cylinder for effecting the radial movement of the said stylus.

5. A device for recording torsional vibrations in a shaft comprising a rotatable inertia mass mounted coaxially with said shaft, a resilient driving connection between the shaft and the inertia mass and yieldable to permit relative rotation of the shaft and the inertia mass, a non-rotating record-receiving cylinder movable to and from a record-receiving position coaxial with respect to the said inertia mass, a marking mechanism rotatable with the inertia mass and including a stylus operatively connected with the shaft to be moved in a direction substantially parallel to the axis of rotation of the shaft and the inertia mass, said stylus being shiftable into and out of recording contact with said record-receiving cylinder and means mounted on said inertia mass for abutment with said cylinder and operatively responsive to said abutment for shifting the stylus into and out of contact with the cylinder synchronously with the positioning of the cylinder in and out of recording position, said means being adjustable for varying the pressure of the stylus against the cylinder.

6. In a vibration indicating device, a pair of relatively light and heavy bodies having limited relative rotation about a common axis, the said relatively light body being enclosed within the relatively heavy body and the latter having an opening through which a portion of the said enclosed body is exposed and a movable indicator arm mounted on the said relatively heavy body and operatively connected with the exposed portion of the enclosed body to be moved in response to relative movements of the said bodies.

7. In a vibration indicating device, a pair of relatively light and heavy bodies having limited relative rotation about a common axis, the said relatively light body being enclosed within the relatively heavy body and the latter body having an opening through which a portion of the enclosed body is exposed and a movable indicator arm mounted on the relatively heavy body for rotation therewith, said indicator arm being movable relatively to the said body about an axis at right angles to the axis of rotation of the body and being operatively connected to an exposed portion of the said enclosed body to be moved about its axis in response to relative movement of the said bodies.

8. In a vibration indicating device, a pair of relatively light and heavy bodies having limited relative rotation about a common axis, the said relatively heavy body having a removable cover and the said relatively light body being enclosed between the cover and the heavy body, pins mounted in the relatively light member and projecting through slots in the said cover, a rotatable shaft mounted on said cover, an indicator arm fixed to the shaft, and means for rotating said shaft to move said arm in response to relative rotation of the said bodies, said means including a drum fixed to the shaft and a flexible member wound about said drum and having its ends connected to the said pins of the relatively light body.

9. In a vibration indicating device, a driving member and a driven member having a common axis of rotation, a resilient drive connection from the driving member to the driven member and limiting the relative rotation of said members, a cover fixed to the driven member and covering the driving member, said cover having openings therein and said driving member having a pair of projections extending through the said openings, a pivotally mounted indicator arm secured to the said cover for rotation therewith, and a flexible element extending from one projection to the other and operatively connected with the said indicator arm to move the latter about its pivot in response to relative rotation of the driving and driven members.

10. In a vibration indicating device, a drive shaft, a driven member free on said shaft and having an enclosed cavity, a drive member within the said cavity of the driven member and fixed to the said drive shaft, said drive member having a pair of projections exposed through openings in the said driven member, a resilient drive connection from the drive member to the driven member and limiting the relative rotation of said drive and driven members, a rotatable indicator shaft mounted on said driven member, an indicator arm fixed to said indicator shaft, and means for rotating the said shaft in response to relative movement of the drive and driven members including a flexible cable coiled around said shaft and connected at its ends to the said projections of the drive member.

11. In a vibration indicating device, a drive shaft, a driven member free on said shaft, a drive member fixed to the shaft adjacent one face of the driven member, a resilient drive connection from the drive member to the driven member and limiting the relative rotation of the said members, a cover member rigidly connected to the driven member for rotation therewith and extending completely around the said drive member to cover the latter, said cover member having a pair of arcuate slots elongated in the direction of the relative movement of the said drive and driven members, adjustable pins mounted in said drive member and projecting through the said slots, a bearing bracket fixedly secured to said cover member, an indicator shaft journaled in said bearing bracket, an indicator arm fixed to the shaft, a drum fixed on the shaft, and a cable coiled around said drum and having its ends connected to the said pins.

12. In an indicating device, a pair of rotatable bodies arranged one within the other and having limited relative rotation about a common axis, the outer body having an opening therein and the inner body having a projection which extends through the opening, said opening being elongated in the direction of rotation of the said bodies in order that said projection may have movement freely in the said opening during relative movement of the said bodies, a pivotally mounted indicator on the outside of the outer body, and means connecting said indicator with the said projection and operating to move the indicator about its pivot in response to relative movement of the said bodies.

13. A device for indicating torsional vibrations resulting in a rotating body from variations in the angular velocity of the body which comprises an indicator movable in a circular path at a substantially constant angular velocity equal to the average angular velocity of the said body and capable of a vibrational movement in a plane at right angles to the plane of its circular path, said indicator being operatively connected to the said body to have a vibrational movement imparted thereto in response to variations in the angular velocity of the said body.

14. A device for indicating torsional vibrations in a shaft comprising a pair of relatively movable bodies having a common axis of rotation, one of which functions in cooperative relation with the said shaft and acquires therefrom corresponding movements of torsional displacement and angular velocity while the other functions at a substantially constant angular velocity equal to the average angular velocity of the said shaft, and an indicator-mechanism rotatable with the body of substantially constant angular velocity and having an indicator operatively mounted and connected with the other body to be moved in a direction substantially parallel to the axis of rotation.

15. A device for indicating torsional vibrations in a shaft comprising a pair of relatively movable bodies, one of which functions in cooperative relation with the said shaft and acquires therefrom corresponding movements of torsional displacement and angular velocity while the other functions at a substantially constant angular velocity equal to the average angular velocity of the shaft, and an indicator arm mounted on the body of substantially constant angular velocity to be moved therewith in a circular path and being movable relatively to the said body in a direction transverse to the plane of the circular path of the arm, said arm being operatively connected to the other body to be so moved in response to relative movement of the said bodies.

16. A device for recording torsional vibrations resulting in a rotating body from variations in the angular velocity of the body which comprises a stationary record-receiving cylinder, a device for marking said cylinder, means for rotating the marking device around the said cylinder at a substantially constant angular velocity equal to the average angular velocity of the rotating body, and means for moving said marking device in a direction substantially at right angles to its plane of rotation, said means being operatively connectible with the said body to cause said marking device to be so moved in response to variations in the angular velocity of the body.

17. In a recording device, a support on which a record receiving member is adapted to be moved to and from a record-receiving position, a movable marking device, and drum-actuated means responsive to the movement of the record receiving member on its support for placing the marking device in record-making contact with the record-receiving member when the latter is in record-receiving position and for withdrawing the marking device from contact with the said member as the latter is moved from record-receiving position.

18. In a recording device, a guide on which a record-receiving member is adapted to be moved to and from a predetermined recording position, a marker movable into and from a position of contact with respect to the record-receiving member, an abutment disposed about said guide and in the path of the said record-receiving member so that the latter abuts therewith when in recording position on the guide, and marker-moving means operatively connected with said abutment member for moving the said marker into contact with the said record-receiving member in response to the abutment of the latter with the said abutment member.

19. In a recording device, in combination, a vibration responsive mechanism including a stylus and a pilot bearing, a record-sheet holder adapted to be moved inwardly on the said pilot bearing, a bell crank lever system operatively connected at one end to the said stylus and at the opposite end being disposed in the path of movement of the record-sheet holder to have contact with said holder at a predetermined point in the inward movement of the holder upon the pilot bearing whereby said lever system is actuated by and upon further inward movement of the holder to press the stylus against the record sheet of the holder, and stop means carried by said holder for abutment with said pilot bearing to limit the extent of the said further inward movement of the holder and hence the degree of pressure of the stylus against the record sheet, said stop means being adjustable for increasing and decreasing the range of inward movement of the holder upon the pilot bearing with a consequent increase and decrease in the pressure of the stylus.

20. In a recording device, in combination, a guide, a record-receiving drum having a central bore to receive said guide and a hollow handle whereby it may be moved to and from record-receiving position on the said guide, said handle being in axial alignment with said bore, and a stop device for arresting the movement of the said drum when the latter is in record-receiving position; said stop including a slidable member mounted in said handle to abut the end of the said guide, said member being movable inwardly and outwardly of the handle, and adjustable means limiting the movement of the slidable member inwardly of the handle.

21. In a recording device, a guide, a record-receiving drum having an axial opening whereby it may be disposed over said guide, a hollow handle at one end of the drum, a slidable member mounted in said hollow handle and movable into the said axial opening of the drum to abut the end of the said guide when the said drum is disposed thereover, and a member threaded into the outer end of the handle for adjustable engagement with said slidable member.

FORD L. PRESCOTT.